Figure 1:
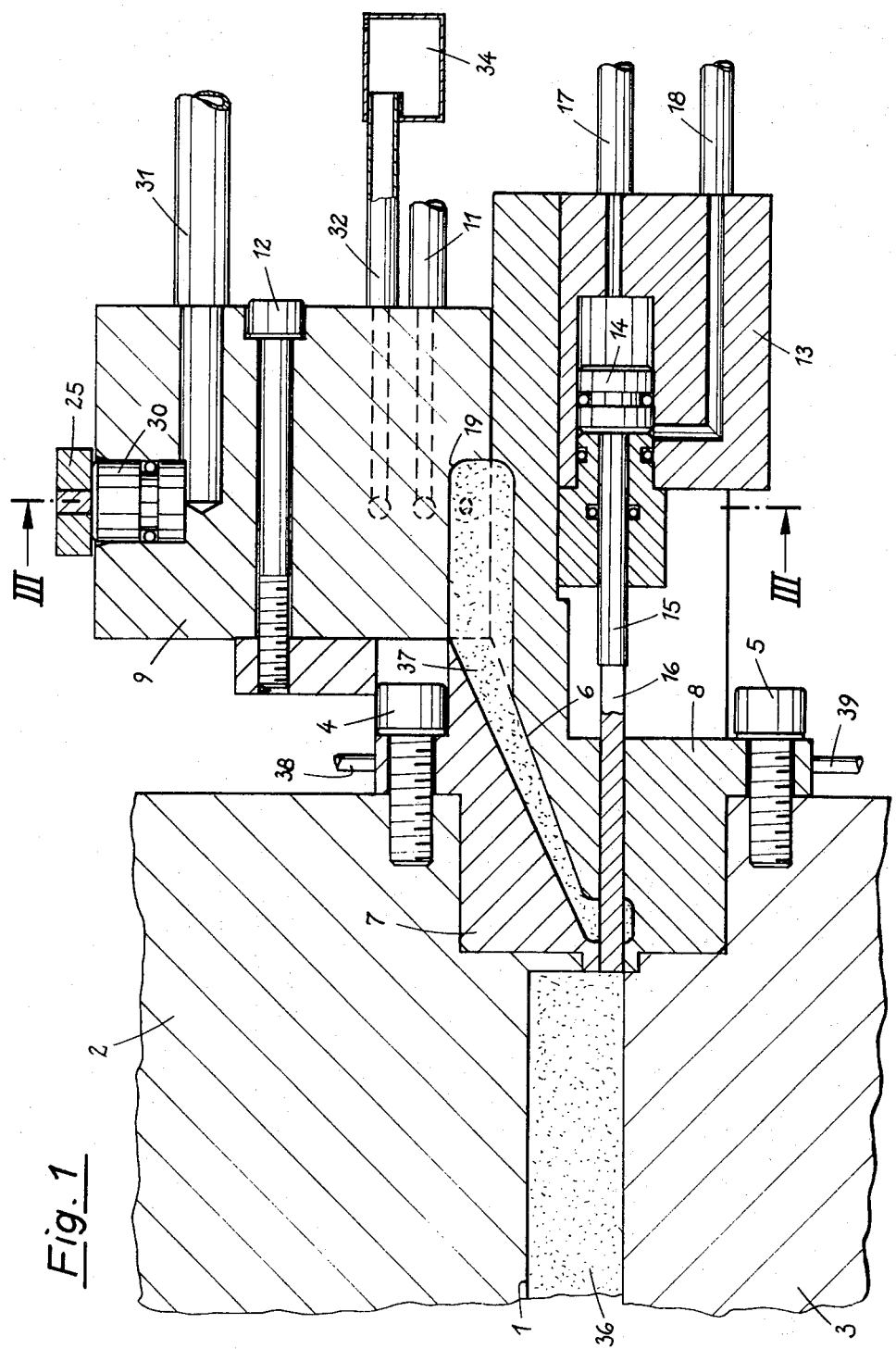

United States Patent [19]
Fries

[11] 3,847,526
[45] Nov. 12, 1974

[54] MATERIAL MIXING MOULDING APPARATUS FOR USE WITH A MOULD TO SHAPE A PLASTICS MATERIAL

[75] Inventor: Bernd Fries, Volkach, Germany

[73] Assignee: Ankerwerk Nurnberg GmbH, Nurnberg, Germany

[22] Filed: Mar. 10, 1972

[21] Appl. No.: 233,474

[30] Foreign Application Priority Data
Mar. 16, 1971 Germany.............................. 2112535

[52] U.S. Cl........ 425/245 R, 425/247, 425/DIG. 51
[51] Int. Cl................................................ B29f 1/03
[58] Field of Search ........... 425/245, 244, 247, 242, 425/207, DIG. 51, 4

[56] References Cited
UNITED STATES PATENTS
| | | | |
|---|---|---|---|
| 2,773,284 | 12/1956 | Kelly.................................... | 425/245 |
| 3,109,199 | 11/1963 | Hardy........................... | 425/DIG. 51 |
| 3,375,553 | 4/1968 | Criss............................... | 425/245 X |
| 3,530,539 | 1/1970 | Gellert............................... | 425/245 |
| 3,706,515 | 12/1972 | Keuerleber et al. ..................... | 425/4 |
| 3,709,640 | 1/1973 | Boden et al............................. | 425/4 |

FOREIGN PATENTS OR APPLICATIONS
1,154,561 6/1969 Great Britain.......................... 425/4

Primary Examiner—J. Spencer Overholser
Assistant Examiner—David S. Safran
Attorney, Agent, or Firm—Marn & Jangarathis

[57] ABSTRACT

A moulding apparatus for use with a mould to shape a plastics material composed of a plurality of liquid components or constituents, the apparatus comprising a two part body having formed therein a mixing chamber for the constituents and an injection duct for directing the mixed constituents from the chamber to a mould cavity, the line of separation of the parts passing through the chamber and the injection duct; also provided is a movable closure member for closing the injection duct when the mould cavity is filled.

11 Claims, 3 Drawing Figures

MATERIAL MIXING MOULDING APPARATUS FOR USE WITH A MOULD TO SHAPE A PLASTICS MATERIAL

This invention relates to moulding apparatus for use with a mould to shape a plastics material composed of a plurality of liquid components or constituents.

According to the invention, there is provided moulding apparatus for use with a mould to shape a plastics material composed of a plurality of liquid components or constituents, the apparatus comprising a body for location on the mould, the body having formed therein a mixing chamber for mixing the liquid constituents therein and an injection duct in communication with the chamber for directing the mixed constituents from the chamber to a mould cavity of the mould, the body being formed in two separable parts, the line of separation passing through the chamber and the injection duct; and a movable closure member for closing the injection duct. When the injection duct is closed, the end face of the closure member which may be slidable, will, preferably, contribute to the action of shaping the plastics material within the mould cavity. According to a further feature of the invention, a piston-cylinder unit is provided to effect movement of the closure member, the piston-cylinder assembly being actuated by a fluid pressure medium and transmitting motion to the particular slidable closure member associated with it. One or more (preferably two) feed ducts open out into this mixing chamber and feed the liquid plastics components into the latter. The feed ducts, leading into the mixing chamber, may open out into the latter by way of nozzle blocks, whose axes include an angle with one another. Further, the axes of these nozzle blocks may lie in a common plane. According to a preferred feature, means are provided to adjust the effective outflow cross-section from the nozzle blocks according to instantaneous requirements. This is achieved by means of flow-control needles, whose end lying closer to the mixing chamber terminates in a conical or frusto-conical portion and faces a frusto conical valve seat surrounding the nozzle bore. The desired alterations in the position of the flow-control needles may be realised by means of mechanical, hydraulic, pneumatic or electrical devices. Preferance is given to a hydraulically operated system of rocker levers which is operatively connected to the individual flow control pins through the intermediary of thruster bolts.

Figure 2:
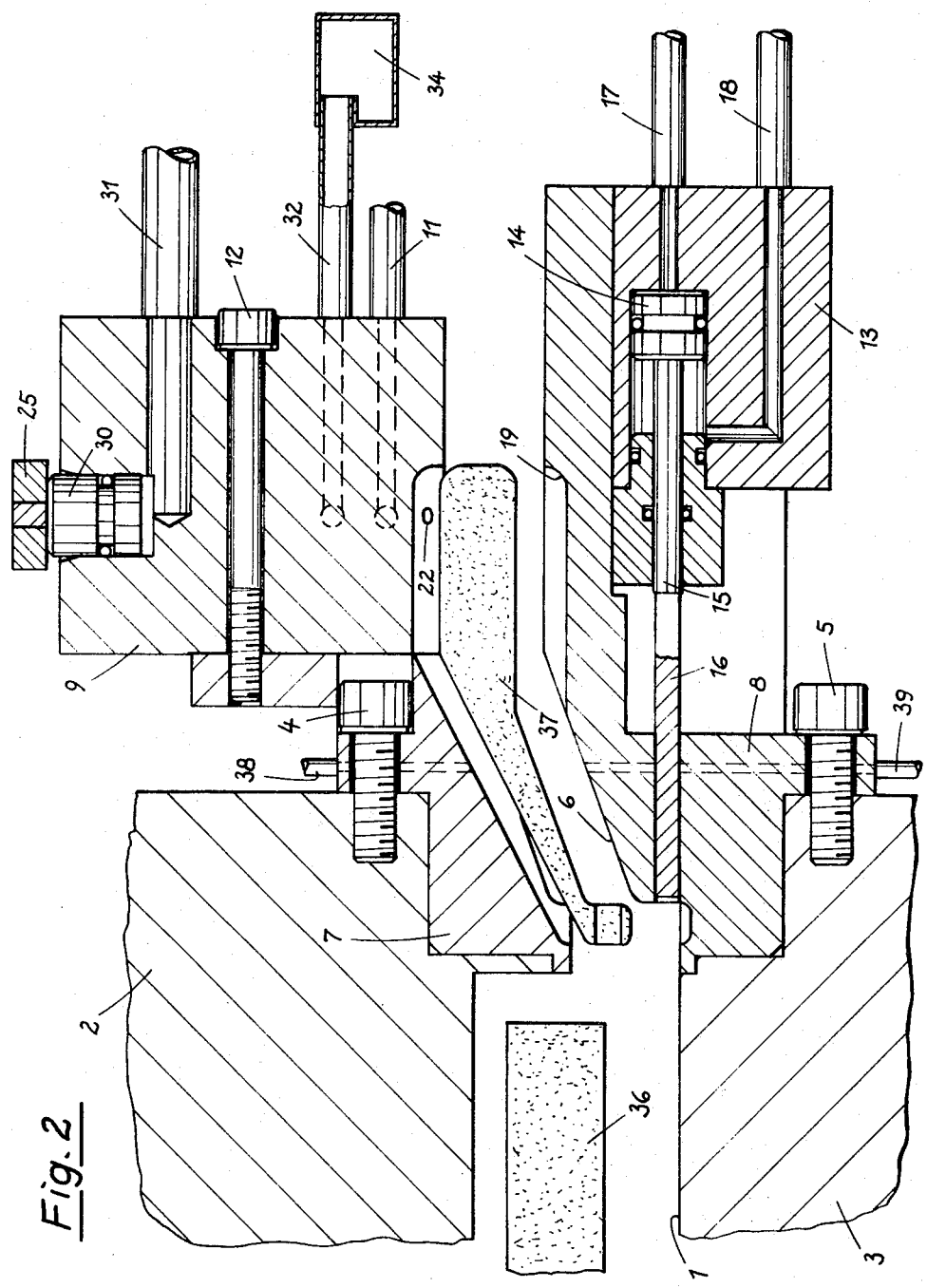
Figure 3:
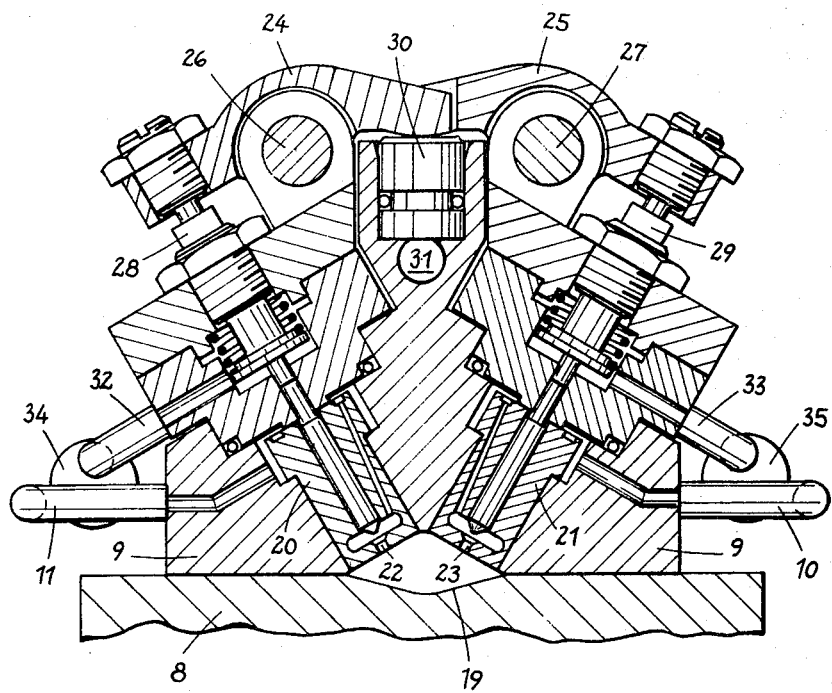

Embodiments of the invention will now be by way of example only described with reference to the accompanying drawings, in which:

FIG. 1 is a longitudinal cross-section of a plastics material moulding apparatus according to the invention, installed on a mould, the individual components of the apparatus being shown in the positions which they assume when charging of a mould has been completed, FIG. 2 is a section similar to that of FIG. 1, although in this Figure a mould-stripping stage is illustrated, and FIG. 3 is a cross-section taken along the line III—III of FIG. 1.

Referring to FIGS. 1 and 2, a mixture, consisting of a number of liquid components or constituents of the plastics material to be moulded, is directed to a mould cavity 1 consituted by mould parts 2 and 3. The two mould parts 2 and 3 are rigidly but releasably connected, by means of clamping elements 4 and 5, to two separable parts 7 and 8 of a body of the present moulding apparatus. Part 7 includes a mixing head 9 having feed ducts 10 and 11 for the liquid components or constituents for the plastics material mixture. The mixing head 9 is frictionally and releasably connected to the remainder of part 7 by means of a threaded bolt 12. The part 8 includes at its end lying remote from the mould parts 2, 3, a control block 13 providing cylinder space in which a piston 14 is axially slidably arranged, the piston being attached to a piston rod 15 at its end face lying closer to the mould parts 2, 3. The piston rod 15 carries at its outer end a slidable closure member 16 which may be of any suitable cross-sectional shape and which, according to the particular shape of the injection (moulding) opening, either extends into an injection (moulding) duct 6 provided in part 7, or penetrates right through the duct 6, and, when the operation of charging a mould has been completed, seals off the injection opening leading to the mould cavity 1 (FIG. 1). Conveniently, the end face of the slidable closure member 16 may form part of the cavity surface thereby contributing towards the final shaping of the component being moulded in the mould cavity 1. The sliding movements of the piston 14, and hence those of the slidable closure member 16, are accomplished by a fluid pressure medium acting on the piston 14 either by way of ducts 17 or duct 18.

The liquid plastics components are mixed together in a mixing chamber 19 of the mixing head 9 through injecting these components into the chamber 19 at high pressure. The line of separation between parts 7 and 8 of the body passes through the mixing chamber and the injection duct. Nozzle blocks 20 and 21 communicate with the feed ducts 10 and 11 and inject the constituents into the mixing chamber. The axes of the bores of the nozzle blocks 20 and 21 include an angle with each other. This angle is so selected that, firstly, a good mixing action is achieved in the mixing chamber 19 (in spite of jet deflection) and, secondly, the smallest possible amount of space is taken up by the mixing head 9, although the drive means employed for exercising positive control have the required simplicity. As is particularly clear from FIG. 3, the angle included between these nozzle blocks 20 and 21 is preferably 60°. Conveniently, the axes of the nozzle blocks 20, 21 lie in a common plane.

Each block 20 and 21 includes means for adjusting the effective cross-sectional area of the nozzle bores 22, 23 and this is achieved by a control needle and a facing valve seat and means for adjusting the distance of the needle from its seat in the open condition of the block. As shown the valve seat is frusto-conical and the end of the needle facing the valve seat is frusto-conical although it may be conical. By means of these adjustments the delivery jets of liquid can be matched in an extremely simple manner to the differing rates of flow and density of the particular plastics components being used at any given time. This positive control also enables misphasing in the feed of the plastics components to be avoided, through synchronous opening and closing of the nozzle bores (delivery cross-sections) 22 and 23. With this in view it is possible to use, for exercising this positive control, a mechanical-electrical, mechanical-pneumatic or mechanical-hydraulic system. In FIG. 3 there is shown, by way of example, a hydraulically-actuated rocker lever system, in which two rocker levers 24 and 25 are mounted on the upper surface of the mixing head 9 for a rocking or tilting motion about fulcra 26 and 27. Rocker lever 24 is in operative connection with the flow-control needle associated with nozzle block 20, through the intermediary of a thruster stud 28, while the other rocker lever 25 similarly acts on the low-control needle of the second nozzle block 21 through the intermediary of a thruster stud 29; the above-mentioned adjustment of the open condition of the needle is effected steplessly by an adjustment screw and lock nut provided on each lever and engaging a respective stud 28 or 29. The rocker levers 24, 25 are actuated by means of a piston 30, and in their turn transmit motion to the thruster studs 28, 29 and, thence, to the flow-control needles. This piston 30 is guided, within the mixing head 9, for sliding motion in a vertical direction, and can be acted on by fluid pressure medium by way of a duct 31. The ducts 32 and 33 are also provided in the vicinity of the thruster studs and flow-control nozzles, these ducts 32 and 33 serving to receive backwardly-flowing quantities of leakage liquid, and to deliver these quantities of leakage liquid to the connecting containers 34 and 35.

The train of events of a working cycle is as follows: at the outset the metering pumps commence their conveying action, and pressure, which is adjusted at a pressure valve, is propagated, within the system of ducts, through the feed ducts 10, 11 and thence to the nozzle bores 22, 23. At this point of time the nozzle bores 22, 23 are still sealed off by the flow-control needles. This is accomplished by virtue of the fact that the piston 30 is acted on with fluid pressure medium by way of feed duct 31, whereby the flow-control needles are thrust — by way of the rocker levers 24, 25 and the thrust studs 28, 29 — on to the nozzle bores 22,23, and so seal off the latter. The individual parts 2, 3 of the mould and of the present moulding apparatus are, naturally, in the positions illustrated in FIG. 1. In this stage only the slidable closure member 16 and piston 30 are in the positions shown in FIG. 2.

When the desired pressure has been built up in the pressure ducts, provided for the individual liquid plastics components, piston 30 is relieved of pressure to an extent which is controlled according to particular circumstances. As the two rocker levers 24 and 25 are actuated by the piston 30, the flow-control needles are simultaneously opened, through the pressure exercised by the liquid plastics components, until they reach their respective stops, which have been positioned to determine the correct magnitude of working stroke of these flow control needles. The mixing stage proper now commences, as a result of the outflow of the liquid plastics components from the nozzle bores 22, 23 into the mixing chamber 19. This mixing stage proper is, conveniently, controlled by a timing member. When the liquid material has left the mixing chamber 19 it immediately passes, by way of the injection (moulding) duct 6, into the mould cavity 1. When the desired amount of plastics material is present in the mould cavity 1 — that is to say when the mixing — and timing-stage has been completed — fluid pressure medium is simultaneously caused to act on the pistons 14 and 30 by way of feed ducts 17 and 31 respectively. As a result of this, the slidable closure member 16 attains the position indicated in FIG. 1, while the flow-control needles synchronously close the nozzle bores 22, 23. At this point of time the metering pumps also cease to perform their pumping action, so that all ducts, serving to feed plastics materials, are relieved of pressure between the pumps and the mixing head 9.

When the dwell time has ended, the completed plastics component 36 is stripped from the mould. This is accomplished by lifting the part 2 of the mould and, therewith, the upper part 7 of the moulding apparatus. It is then a simple matter to remove the moulding 36, which has thus been exposed, by means of known devices or manually from the mould 2, 3. In the course of this working stage the hardened gate 37 is also exposed, this gate 37 being located in the moulding duct 6 and in the mixing chamber 19. When the mould 2, 3 is opened, this gate 37 is automatically stripped, possibly with the use of compressed air, which arrives through the ducts 38 and/or 39. In this way it is ensured that cleaning the mixing chamber 19 and the moulding duct 6 (with air or suitable solvents) can be dispensed with.

It will be apparent that the above described apparatus is of relatively simple construction and is readily accessible to inspection and for maintenance and repair purposes. Also it will be apparent that the apparatus will be economic in use and susceptible of a wide range of practical applications.

Use of the above described apparatus results in a considerable number of advantages. First of all, there is no need for the provision — apart from the moulding apparatus itself — of a separate mixing — or feeder-head. Use of the present apparatus also makes it unnecessary to bring the whole cross-section of one or more nozzle bores into the mould cavity through the use of special devices. Further, it is possible to eliminate the waste of time entailed in cleaning or rinsing, and also to dispense with the use of cleaning agents during the moulding cycle. There is also the advantage that the liquid plastics components cannot be impaired through the action of residual cleaning agents. Moreover, the present apparatus enables the mould cavity to be closed off in a very satisfactory manner, that is to say by the part of the moulding apparatus lying closer to the mould itself. Also, it is possible to eliminate non-uniform jet delivery (outflow) energy, occurring during variations in the throughput, while at the same time there is no longer any requirement for maintaining a reserve store of different nozzles. The necessity is eliminated of maintaining the liquid plastics components in a continual state of circulation, so that the considerable energy consumption which would otherwise be entailed is eliminated. Also, any misphasing in the relative infeed of the different liquid plastics components, which are required to be mixed together, is prevented from occuring. If the present moulding apparatus is installed on its associated mould in a manner which is satisfactory from the point of view of the flow of these liquids — for example if the moulding apparatus is positioned obliquely on its associated mould — then there will no longer be free jets of liquid passing into the mould cavity. In this way it can be ensured that there will be no eddy formation in these liquid plastics components and, hence, no air inclusions in these components. A further advantage consists in the fact that it is no longer necessary to expect the formation of gate "rods", so that material can thus be saved. Naturally, the parts constituting the mould do not have to be subsequently treated for removal of such gate "rods". Finally, it should be pointed out that it will be of particular advantage, for many undertakings concerned with moulding plastics material, that the present moulding apparatus, does not have to be used only in conjunction with a special mould.

I claim:

1. A plastics material transfer apparatus for use with a mould comprised of first and second mould sections defining a mould cavity for shaping a plastics material composed of a plurality of liquid constituents, said apparatus comprising:

a body comprised of first and second body sections including means for mounting said first and second body sections on said first and second mould sections, respectively, of said mould whereby said respectively mounted sections separate and close during opening and closing of said mould, said body having formed therein a mixing chamber for mixing said liquid constituents therein and an injection duct in fluid communication with said mould cavity for passing said mixed constituents from said mixing chamber to said mould cavity, said first and second body sections of said body being formed with the line of separation thereof passing through said mixing chamber and said injection duct; and a movable closure member for closing said injection duct.

2. A plastics material transfer apparatus according to claim 1, wherein said closure member is slidable within said body and is formed with an end face which in the closed condition of the closure member is co-extensive with said body.

3. A plastics material transfer apparatus according to claim 1 and including a piston and cylinder unit for effecting movement of the closure member.

4. A plastics material transfer apparatus according to claim 1 wherein the body is provided with a plurality of feed ducts in communication with the mixing chamber to direct the liquid constituents thereto.

5. A plastics material transfer apparatus according to claim 4 and including nozzle blocks in communication with the feed ducts and opening into the mixing chamber.

6. A plastics material transfer apparatus according to claim 5, wherein the axes of the bores of the nozzle blocks include an angle therebetween.

7. A plastics material transfer apparatus according to claim 5 wherein the axes of the bores of the nozzle blocks lie in a common plane.

8. A plastics material transfer apparatus according to claim 5, wherein each nozzle block includes means for adjusting the effective cross-sectional area of the nozzle bore whereby to control the flow of liquid therethrough.

9. A plastics material transfer apparatus according to claim 8, wherein each said adjusting means includes a needle movable relatively to a valve seat surrounding the nozzle bore, and means for adjusting the distance of the needle from its seat in the open condition of the block.

10. A plastics material transfer apparatus according to claim 9, wherein the valve seat is of frusto-conical shape and wherein the end of the needle facing said seat is of frusto-conical shape.

11. A plastics material transfer apparatus according to claim 9 and including a rocker lever engageable with an intermediate thrust stud in turn engageable with the needle, and wherein power means are provided to rock the lever to cause the needle via the stud to move toward its valve seat.

* * * * *